UNITED STATES PATENT OFFICE.

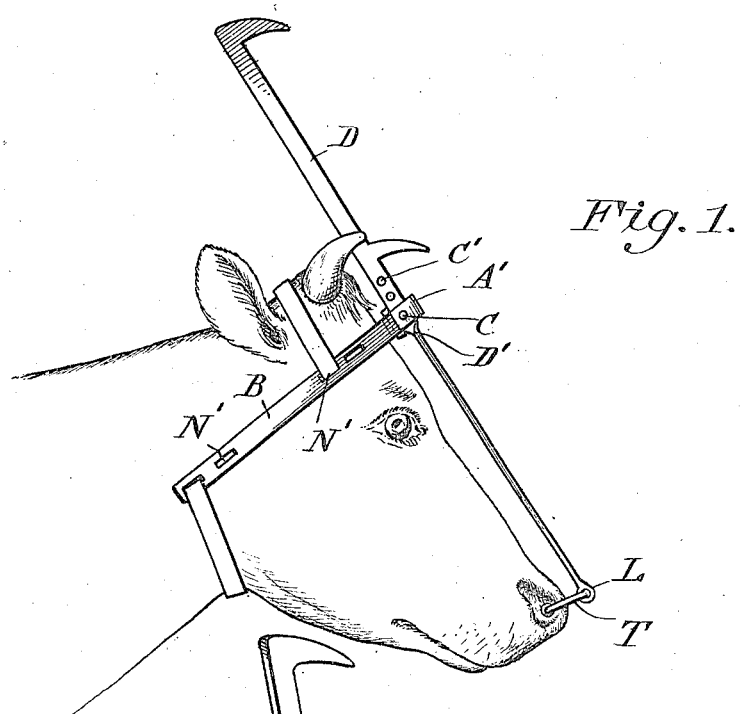
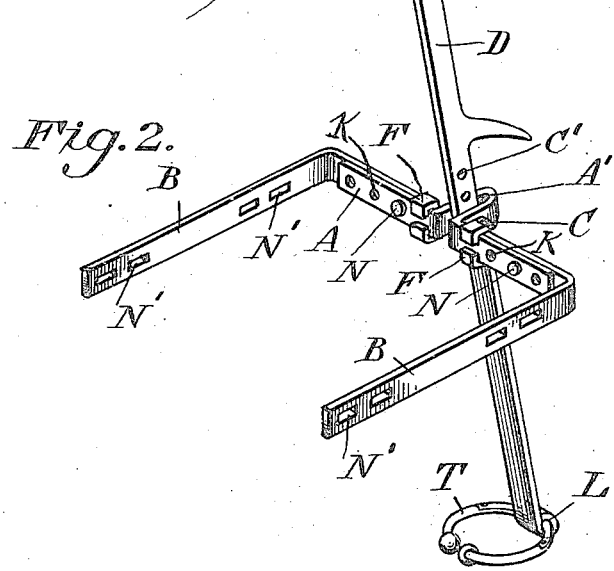
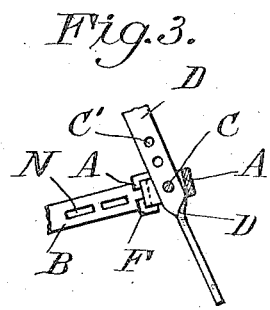

NORMAN MILLER AND JOHN P. MILLER, OF DURANT, OKLAHOMA.

ANIMAL-POKE.

1,247,562.    Specification of Letters Patent.    Patented Nov. 20, 1917.

Application filed June 19, 1917. Serial No. 175,657.

*To all whom it may concern:*

Be it known that we, NORMAN MILLER and JOHN P. MILLER, citizens of the United States, residing at Durant, in the county of Bryan and State of Oklahoma, have invented certain new and useful Improvements in Animal-Pokes; and they do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in "animal pokes" and the object in view is to produce a simple and efficient device of this nature which may be adjustably held upon the head of an animal and still permit it to graze or eat from a manger, also allowing the animal to lie down and rest without interference from the poke.

Our invention comprises various details of construction, combinations and arrangements of parts which will be hereinafter fully described, shown in the accompanying drawings and then specifically defined in the appended claims.

Our invention is illustrated in the accompanying drawings which, with the letters of reference marked thereon, form a part of this specification and in which:

Figure 1 is a perspective view showing the application of the invention to the head of an animal.

Fig. 2 is an enlarged detailed view of the poke.

Fig. 3 shows the means for limiting the tilting movement of the spur carrying bar.

Reference now being had to the details of the drawings by letter:

A brow bar is provided which is made up of straps of metal, designated respectively by letters A and B, the strap A being bent upon itself at A' and carrying a pivotal pin C upon which a spur bar D, provided with a series of perforations C', is pivotally mounted and adapted for vertical adjustment. Said straps B have lugs F projecting from the opposite edges thereof and adapted to engage over the opposite edges of the strap A, and each strap B is provided with perforations K for the reception of the adjusting pin N passing through straps B and A, and the outer portions of each strap B are bent at right angles to the adjustable portions of the strap and are provided with slots N' for the reception of straps, whereby the device may be attached to the head of an animal.

Said spur bar D has a twisted portion, as at D', and the twisted portions serve as means for limiting the tilting movement of said spur bar by the said twisted portions coming in contact with the lower edges of the portions, which are bent upon themselves and which carry the pivotal pin C. The extreme lower end of the spur bar has an eye L therein to which a nose ring T is pivotally connected, which ring is made of two pivotal sections, the free ends of which are adapted to engage the nostrils of the animal in the usual way.

By the provision of a poke, made in accordance with our invention, the device may be worn with ease while the animal is grazing or eating out of a manger and will permit the animal to lie down without interference, and owing to the fact that no portion of the poke projects below the nose of the animal, greater freedom is allowed the animal than with other types of pokes adapted for the same purpose.

By the provision of the tilting movement of the spur bar, the animal may be permitted to tilt its head in different directions without interference.

What we claim to be new is—

1. An animal poke comprising a brow strap, made up of a plurality of bars one of which is bent upon itself forming a loop with oppositely disposed perforations therein, a pin mounted in the latter, the other bars of the brow strap adjustably connected to the one which is bent upon itself, an adjustable spur bar pivotally mounted upon said pin, a nose ring pivoted to the spur bar, said spur bar being twisted forming edges coöperating with the lower edges of the loop, to limit the tilting movement of the bar.

2. An animal poke comprising a brow strap made up of two angled bars which are perforated and having oppositely disposed lugs struck up therefrom, an intermediate bar bent upon itself to form a loop with oppositely disposed perforations therein, adjusting screws in registering perforations in said bars, oppositely disposed portions of the bar which is bent upon itself to form a loop being engaged by said lugs and adjustable, an adjustable spur bar pivotally mounted in said loop and a nose ring connected to the spur bar, as set forth.

In testimony whereof we hereunto affix our signatures in presence of two witnesses.

NORMAN MILLER.
JOHN P. MILLER.

Witnesses:
 TIM E. WHEELER,
 J. WINFIELD SCOTT.

Copies of this patent may be obtained for five cents each, by addressing the "Commissioner of Patents, Washington, D. C."